(12) United States Patent
Volovich et al.

(10) Patent No.: US 11,580,978 B2
(45) Date of Patent: Feb. 14, 2023

(54) MACHINE LEARNING FOR INTERPRETATION OF SUBVOCALIZATIONS

(71) Applicant: Google LLC, Mountain View, CA (US)

(72) Inventors: Yaroslav Volovich, Cambridge (GB); Ant Oztaskent, London (GB); Blaise Aguera-Arcas, Seattle, WA (US)

(73) Assignee: Google LLC, Mountain View, CA (US)

( * ) Notice: Subject to any disclaimer, the term of this patent is extended or adjusted under 35 U.S.C. 154(b) by 50 days.

(21) Appl. No.: 17/103,345

(22) Filed: Nov. 24, 2020

(65) Prior Publication Data

US 2021/0183383 A1 Jun. 17, 2021

Related U.S. Application Data

(60) Provisional application No. 62/948,989, filed on Dec. 17, 2019.

(51) Int. Cl.
*G10L 15/22* (2006.01)
*G10L 15/18* (2013.01)
(Continued)

(52) U.S. Cl.
CPC .......... *G10L 15/22* (2013.01); *G10L 15/1815* (2013.01); *H04R 1/08* (2013.01);
(Continued)

(58) Field of Classification Search
CPC ...... H04R 1/1091; H04R 1/08; H04R 1/1041; H04R 1/1016; H04R 2225/43; H04R 1/14; G10L 15/22; G10L 15/1815; G10L 15/24; G10L 15/16; G10L 2015/223; G10L 15/18; G10L 25/30; G10L 15/25
(Continued)

(56) References Cited

U.S. PATENT DOCUMENTS 10,621,973 B1 * 4/2020 McVicker ................ H04R 1/14
2007/0291953 A1 12/2007 Ngia et al.
(Continued)

OTHER PUBLICATIONS

Li et al. Beyond Pulse: Can the in-Ear Photoplethysmogram Signal Understand What You Say? Nov. 4, 2018. Real-World Embedded Wireless Systems and Networks, ACM, 2 Penn Plaza, Suite 701, New York, NY 10121-0701, USA, pp. 25-30. DOI: 10.1145/3277883.3277891.
(Continued)

*Primary Examiner* — Md S Elahee
(74) *Attorney, Agent, or Firm* — Colby Nipper PLLC

(57) ABSTRACT

Provided is an in-ear device and associated computational support system that leverages machine learning to interpret sensor data descriptive of one or more in-ear phenomena during subvocalization by the user. An electronic device can receive sensor data generated by at least one sensor at least partially positioned within an ear of a user, wherein the sensor data was generated by the at least one sensor concurrently with the user subvocalizing a subvocalized utterance. The electronic device can then process the sensor data with a machine-learned subvocalization interpretation model to generate an interpretation of the subvocalized utterance as an output of the machine-learned subvocalization interpretation model.

22 Claims, 6 Drawing Sheets

(51) Int. Cl.
    *H04R 1/08*    (2006.01)
    *H04R 1/10*    (2006.01)
(52) U.S. Cl.
    CPC ......... *H04R 1/1016* (2013.01); *H04R 1/1041* (2013.01); *G10L 2015/223* (2013.01)
(58) Field of Classification Search
    USPC ........................................................ 704/232
    See application file for complete search history.

(56) References Cited

U.S. PATENT DOCUMENTS

2017/0249942 A1* 8/2017 Gilbert .................... G10L 15/25
2018/0113673 A1   4/2018 Sheynblat
2018/0336901 A1  11/2018 Masaki et al.
2021/0012766 A1* 1/2021 Kim ........................ G10L 25/30

OTHER PUBLICATIONS

International Search Report and Written Opinion for International Application No. PCT/US2020/062014 dated Feb. 24, 2021. 17 pages.
Kurtis G. Gruters, et al., The eardrums move when the eyes move: A multisensory effect on the mechanics of hearing, PNAS, published online Jan. 23, 2018, 10 pages.
Naoki Kimura, et al., SottoVoce: An Ultrasound Imaging-Based Silent Speech Interaction Using Deep Neural Networks, CHI 2019, May 4-9, 2019, Glasgow, Scotland UK, 11 pages.
International Preliminary Report on Patentability for International Application No. PCT/US2020/062014 dated Jun. 30, 2022. 10 pages.

* cited by examiner

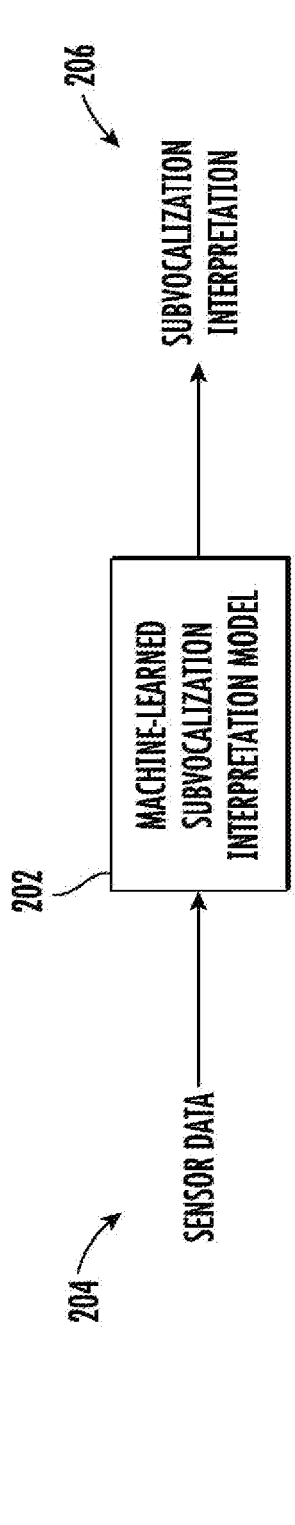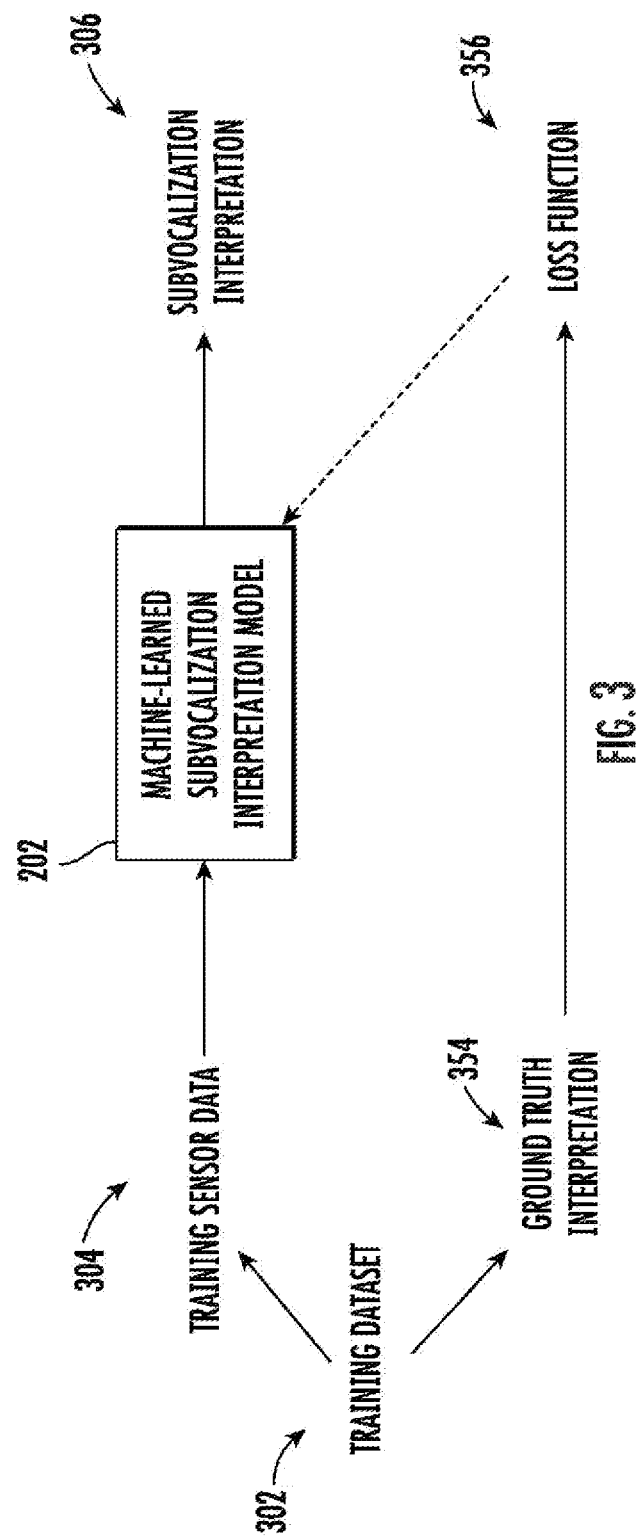

MACHINE LEARNING FOR INTERPRETATION OF SUBVOCALIZATIONS

CROSS-REFERENCE TO RELATED APPLICATIONS

The present application claims the benefit of the filing date of U.S. Provisional Patent Application No. 62/948,989 filed Dec. 17, 2019, the disclosure of which is hereby incorporated herein by reference.

FIELD

The present disclosure relates generally to an electronic device configured to interpret and act upon subvocalized utterances. More particularly, the present disclosure relates to an in-ear device and associated computational support system that leverages machine learning to interpret sensor data descriptive of one or more in-ear phenomena during subvocalization by the user.

BACKGROUND

Today there are two primary ways to enter information, such as requests, commands, or text into a computer. A first set of entry modalities require physical interaction between the user and the device. As an example, use of a keyboard, mouse, touch-pad, and/or touch-screen require the user to physically interact, such as using their fingers or with a stylus, with the computer or periphery input devices of the computer. A second modality for entering data is through the use of speech, such as through voice commands.

Both of these entry modalities have drawbacks. For example, physical input modalities such as keyboards, mouse, touch-screen occupy the hands of the user and often require the user to look at a screen as well, which can be unsafe or undesirable in many situations such as when operating a vehicle.

On the other hand, while speech-based interfaces avoid occupying the user's hands and/or gaze, speech-based interfaces offer reduced privacy because the user's interaction with the computer through a speech-based interface can be audible to any persons located around the user. In many cases, users would prefer that persons located nearby not overhear the user's interactions with a computer, regardless of whether the content of the interaction contains sensitive information. As one example, in order to be polite, a person riding on public transit may not wish to audibly input information, such as requests, commands, or text, into a computer. In another more extreme example, an emergency service responder such as a law enforcement officer may wish to provide information, such as to a support team or fellow officer via a computing device, without speaking audibly, so as not to reveal their location.

SUMMARY

Aspects and advantages of implementations of the present disclosure will be set forth in part in the following description, or can be learned from the description, or can be learned through practice of the implementations.

One example aspect of the present disclosure is directed to an electronic device that includes one or more processors and one or more non-transitory computer-readable media that store instructions that when executed by the one or more processors cause the electronic device to perform operations. The operations include receiving sensor data generated by at least one sensor at least partially positioned within an ear of a user, wherein the sensor data was generated by the at least one sensor concurrently with the user subvocalizing a subvocalized utterance. The operations include processing the sensor data with a machine-learned subvocalization interpretation model to generate an interpretation of the subvocalized utterance as an output of the machine-learned subvocalization interpretation model.

The at least one sensor can include one or more microphones that convert a sound wave located within an ear canal of the ear of the user to the sensor data. The sound wave located within the ear canal of the user can be generated by an eardrum of the user. When the one or more microphones are placed within the ear of the user, the one or more microphones can be directed toward the eardrum of the user. The at least one sensor can include one or more of an accelerometer; a gyroscope; a RADAR device: a SONAR device; a LASER microphone; an infrared sensor; or a barometer.

The electronic device can be sized and shaped to be at least partially positioned within the ear of the user. The electronic device is coupled to an ancillary support device that is physically separate from the at least one sensor.

The interpretation of the subvocalized utterance output by the machine-learned subvocalization interpretation model can include a transcript of the subvocalized utterance in textual form. The interpretation of the subvocalized utterance output by the machine-learned subvocalization interpretation model comprises a classification of the subvocalized utterance into one or more of a plurality of categories. The plurality of categories can include a plurality of defined commands.

The operations can further include determining, by an artificial intelligence-based personal assistant system, at least one operation to perform based at least in part on the interpretation of the subvocalized utterance output by the machine-learned subvocalization interpretation model.

Another example aspect of the present disclosure is directed to an ear bud. The ear bud includes at least one sensor; one or more processors; and one or more non-transitory computer-readable media that store instructions that when executed by the one or more processors cause the ear bud to perform operations. The operations include receiving sensor data generated by the at least one sensor, wherein the sensor data was generated by the at least one sensor concurrently with the user subvocalizing a subvocalized utterance and with the at least sensor at least partially positioned within an ear of a user. The operations include processing the sensor data with a machine-learned subvocalization interpretation model to generate an interpretation of the subvocalized utterance as an output of the machine-learned subvocalization interpretation model.

The present disclosure provides for an in-ear device and associated computational support system that leverages machine learning to interpret sensor data descriptive of one or more in-ear phenomena during subvocalization by the user. Specifically, subvocalization refers to a practice where a person forms with their mouth, tongue, etc. the shape(s) necessary to pronounce a certain sound but does not exhale sufficient air past their vocal cords, to produce audible speech. In some instances, this practice can be referred to as "silent reading" or "silent speech." Even though audible speech is not produced because little to no air is pushed through the vocal cords, certain phenomena such as audio waves produced by vibrations in the eardrum/membrane still occur within the user's ear. Aspects of the present disclosure leverage machine learning techniques to interpret sensor data that describes such in-ear phenomena, resulting in a system that is able to interpret and intelligently respond to subvocalized utterances made by a user. In such fashion, and as compared to existing speech-based interfaces, the systems and methods proposed herein enable hands-free data entry in a more private manner.

An in-ear device can be positioned at least partially within a user's ear. The in-ear device can include one or more sensors, such as microphones, that generate sensor data that describes phenomena, for example audio waves, occurring within the user's ear while the user subvocalizes a subvocalized utterance. A machine-learned subvocalization interpretation model can be implemented by the in-ear device and/or an ancillary support device. The model can receive and process the sensor data to generate an interpretation of the subvocalized utterance. As examples, the interpretation can include a textual transcript of the subvocalized utterance and/or classification of the subvocalized utterance into a plurality of predefined classes. As an example, the classification can correspond to a plurality of predefined commands or actions such as "Play my favorite album". The interpretation of the subvocalized utterance can be used, for example by an artificial intelligence (AI)-based personal assistant, to cause the (AI)-based personal assistant to perform one or more operations, such as entering or responding to the textual transcript or performing the requested action such as playing a certain musical album, booking an appointment, etc. In such fashion, the in-ear device and/or associated system can enable a user to input, request, command, or otherwise interact with a computing system through subvocalization.

Thus, one particular example implementation of the systems described herein can include two parts: (a) a microphone system placed in the user's ear, such as within the outer ear or within the ear canal, and pointed at the user's eardrum; and (b) a machine learning system capable of decoding signals from the microphone system into an actionable interpretation such as, as examples, assistant commands or directly into human-readable text or speech.

The proposed systems and methods are based on the principle that humans can quickly train themselves to speak "silently", for example by still trying to make normal sounds but without pushing sufficient air through their vocal cords to generate audible speech. Such actions through muscle movement in human speech apparatus make the eardrum and the inner ear vibrate, which causes an audio signal within the ear canal which can be collected by a specially placed microphone system.

However, the in-ear audio signal caused by subvocalization is not audible by other people. Furthermore, even if such sounds were audible by other persons, the audio recorded by the microphone array placed in the ear and pointed at the eardrum, for example towards "inside" the ear, is highly distorted and even after amplification is not directly recognizable by humans. Thus, simple amplification of the audio signal is not sufficient to render understandable content.

To resolve these challenges, the present disclosure leverages a machine-learned subvocalization interpretation model, such as a neural network. For example, the machine-learned model can be configured to process the audio signal captured by the microphone array into an actionable and/or understandable interpretation such as a textual transcription of the audio signal caused by the subvocalization.

In some implementations, the machine-learned subvocalization interpretation model can translate the audio signal into a representation which can be translated, for example by the same model or another model, into: special commands, text, and/or speech. Examples of special commands can include "what's the time?", "when is my next meeting?", and "play music." Examples of text can include "send email to my partner that I bought ingredients and will cook dinner tonight." Examples of speech can include "make a call to the dentist", or "Hello, I'd like to book an appointment next week."

In some implementations, the machine-learned subvocalization model can be trained in a supervised learning approach. A training dataset can include sets of sensor data, such as audio signals captured by microphones, that were collected while one or more people were subvocalizing a known string. Therefore, the model's prediction on each set of sensor data can be compared to the known string.

In some implementations, the in-ear device and/or associated system can perform or otherwise receive data associated with a user training/on-boarding procedure in which a new user is asked to perform subvocalizations of known content, such as by reading certain text without pushing air through the user's vocal cords. The model can be trained, re-trained, refined, personalized, etc. based on the calibration data. This can enable the subvocalization model to have improved accuracy for a specific user.

Additionally or alternatively, in some implementations, the subvocalization model can first be trained on generic audible speech examples. The model trained on normal audio can then be refined via transfer learning to train on the subvocalization data. In some implementations, instead of modifying lower layers, higher layers can simply be added to the top of the transferred model. The model can process input from the bottom-up, beginning with the input subvocalization processed through the lower layers trained on normal audio and then through the added higher layers. These added higher layers can be trained on the smaller dataset collected via the in-ear microphone array from a variety of users.

The present disclosure provides a number of technical effects and benefits. As one example, the proposed techniques which interpret subvocalization enable human machine interface with improved privacy and/or safety. As an example, an emergency responder can use a device implementing aspects of this disclosure for conveying information without revealing their location, for example in the use case of an emergency responder who does not wish to reveal their location. As another example, the proposed techniques can enable improved and more frequent use of non-visual interfaces. The more frequent use of non-visual interfaces reduces the amount of screen visualizations and light output that the device needs to produce to enable the same interaction with the user, thereby conserving computing resources such as battery or energy usage. Another aspect is directed to a method. The method can include generating, by at least one sensor at least partially positioned within an ear of a user, sensor data representative of a subvocalized utterance made by the user; and processing the sensor data with a machine-learned subvocalization interpretation model to generate an interpretation of the subvocalized utterance as an output of the machine-learned subvocalization interpretation model.

The sensor data can be based on sound waves produced by vibrations within the ear of the user resulting from the user subvocalizing the subvocalized utterance. The sensor can be part of an in-ear device. The in-ear device can be coupled with at least one ancillary support device.

The machine-learned subvocalization interpretation model can be implemented in the in-ear device. The machine-learned subvocalization interpretation model can be implemented in the at least one ancillary support device.

Another aspect is directed to a system, the system including: at least one sensor configured to be at least partially positioned within an ear of a user and to generate sensor data concurrently with the user subvocalizing a subvocalized utterance, one or more processors; and one or more computer-readable media. The one or more computer-readable media can store instructions that when executed by the one or more processors, can cause the one or more processors to perform operations comprising: receiving the sensor data generated by the at least one sensor; processing the sensor data with a machine-learned subvocalization interpretation model to generate an interpretation of the subvocalized utterance as an output of the machine-learned subvocalization interpretation model.

The at least one sensor can be configured to generate the sensor data based on sound waves produced by vibrations within the ear of the user resulting from the user subvocalizing the subvocalized utterance. The sensor can be part of an in-ear device of the system. The in-ear device can be coupled with at least one ancillary support device of the system. The machine-learned subvocalization interpretation model can be implemented in the in-ear device. The machine-learned subvocalization interpretation model can be implemented in the at least one ancillary support device.

Other aspects of the present disclosure are directed to various systems, apparatuses, non-transitory computer-readable media, user interfaces, and electronic devices.

These and other features, aspects, and advantages of various implementations of the present disclosure will become better understood with reference to the following description and appended claims. The accompanying drawings, which are incorporated in and constitute a part of this specification, illustrate example implementations of the present disclosure and, together with the description, serve to explain the related principles.

BRIEF DESCRIPTION OF THE DRAWINGS

Detailed discussion of implementations directed to one of ordinary skill in the art is set forth in the specification, which makes reference to the appended figures, in which:

FIG. 2 depicts a block diagram of an example inference scheme for a machine-learned subvocalization interpretation model according to example implementations of the present disclosure.

FIG. 3 depicts a block diagram of an example training scheme for a machine-learned subvocalization interpretation model according to example implementations of the present disclosure.

Figure 1A:
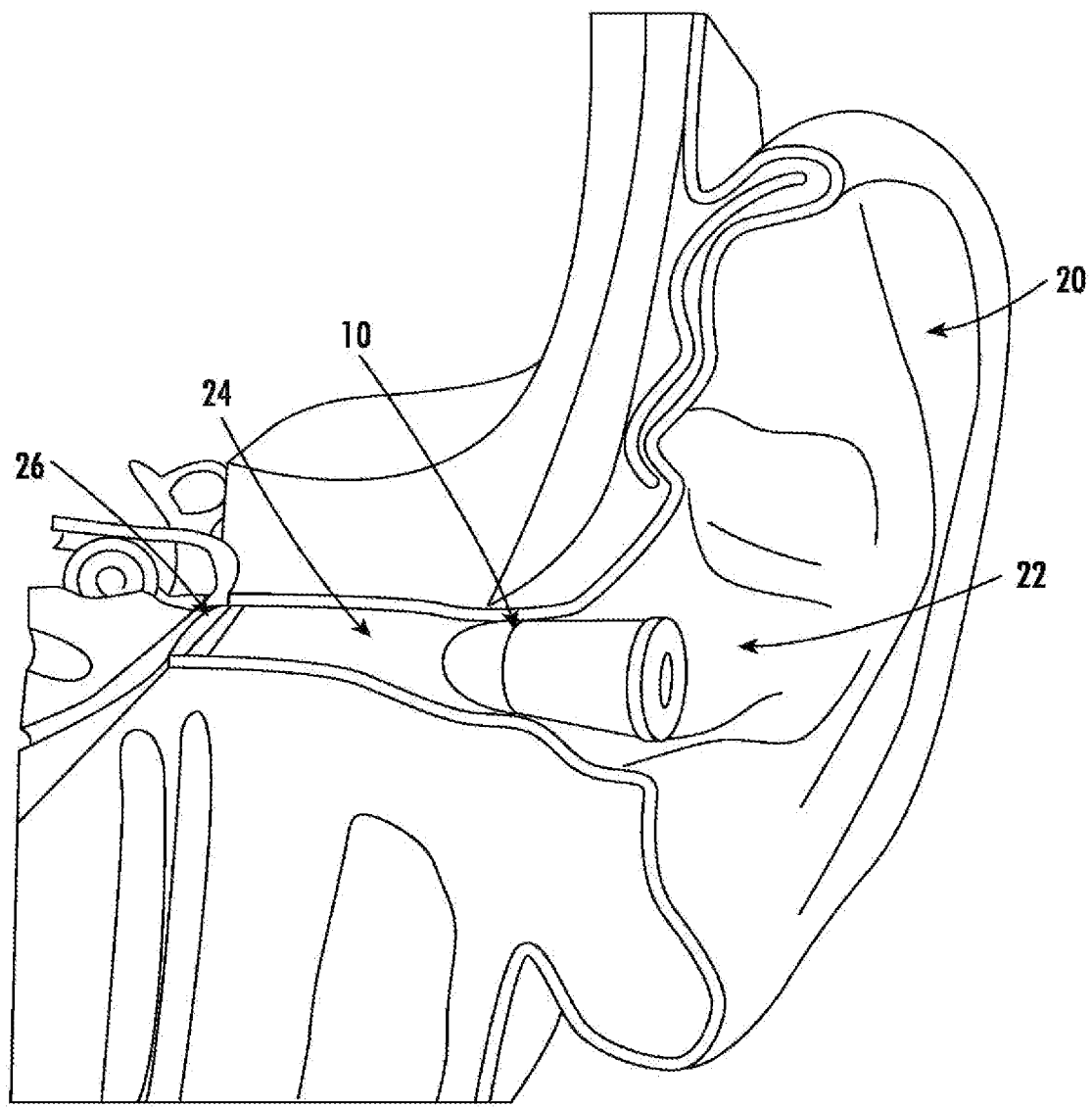
FIG. 1A depicts a graphical diagram of an example in-ear device positioned within an ear of a user according to example implementations of the present disclosure.

Reference numerals that are repeated across plural figures are intended to identify the same features in various implementations.

DETAILED DESCRIPTION

FIG. 1A depicts a graphical diagram of an example in-ear device 10 positioned within an ear 20 of a user according to example implementations of the present disclosure. The device 10 can be positioned at least in part in the outer ear 22 and/or at least in part in the inner ear such as the ear canal 24. The device 10 can include one or more sensors, as described herein with reference to FIG. 1B, which can generate sensor data that describes phenomena occurring in the ear 20, such as within the ear canal 24. As examples, the phenomena can include movement, vibrations, audio signals, visual changes, tissue deformations, and/or other phenomena within the ear 20, such as within the ear canal 24.

Figure 1B:
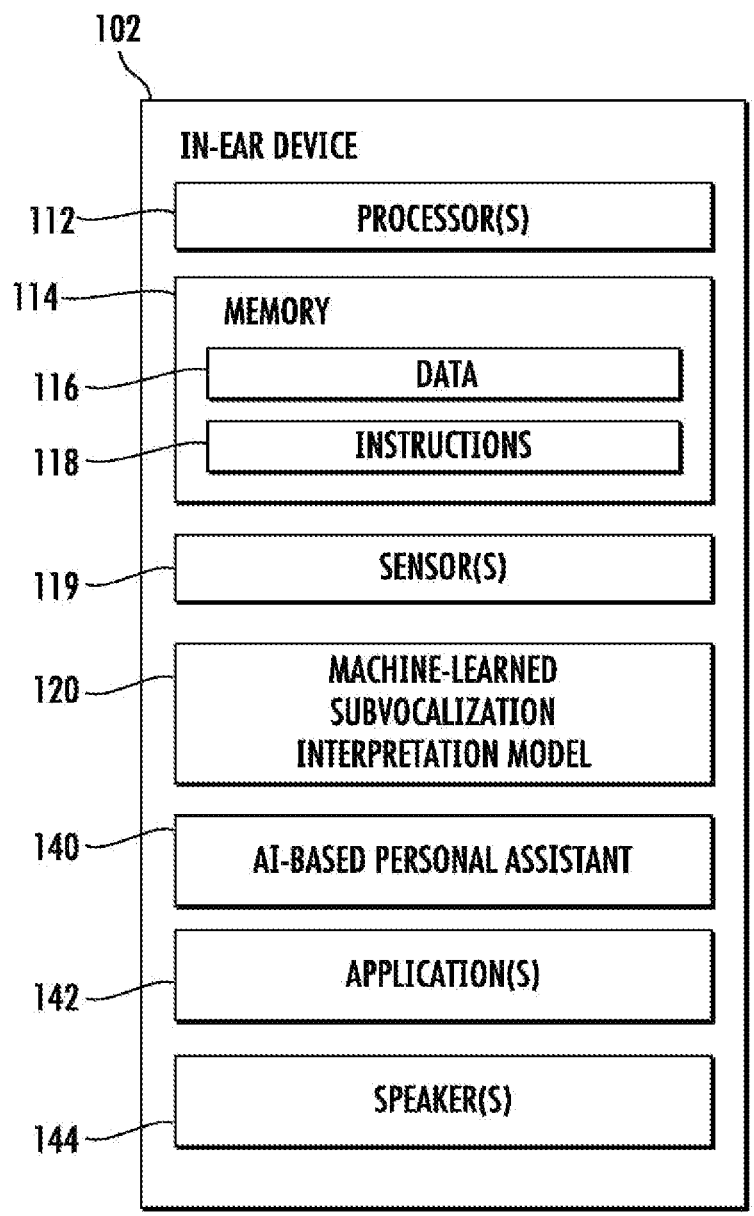
FIGS. 1B-D depict block diagrams of example computing systems that include an in-ear device according to example implementations of the present disclosure.
Figure 1C:
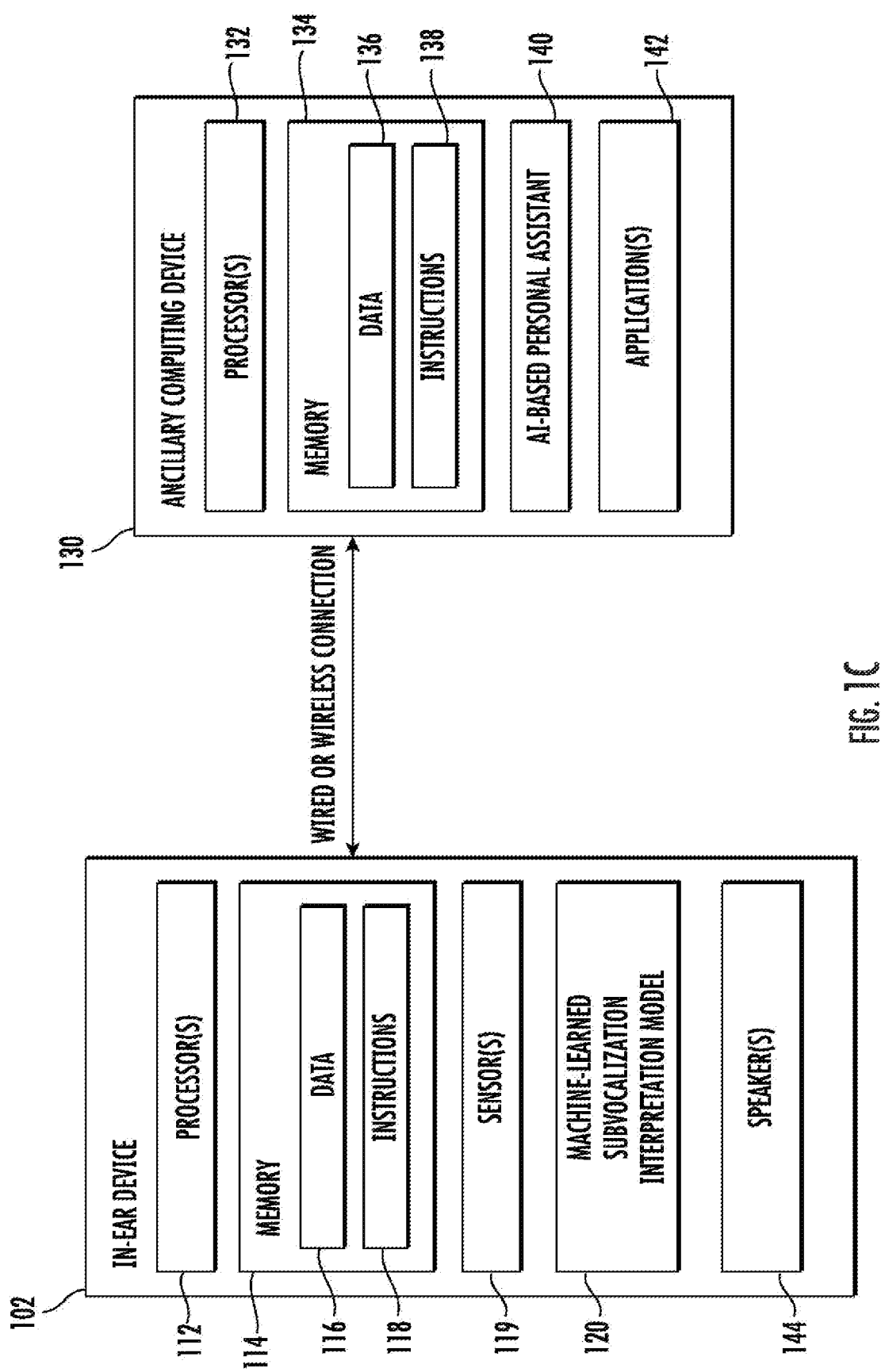
Figure 1D:
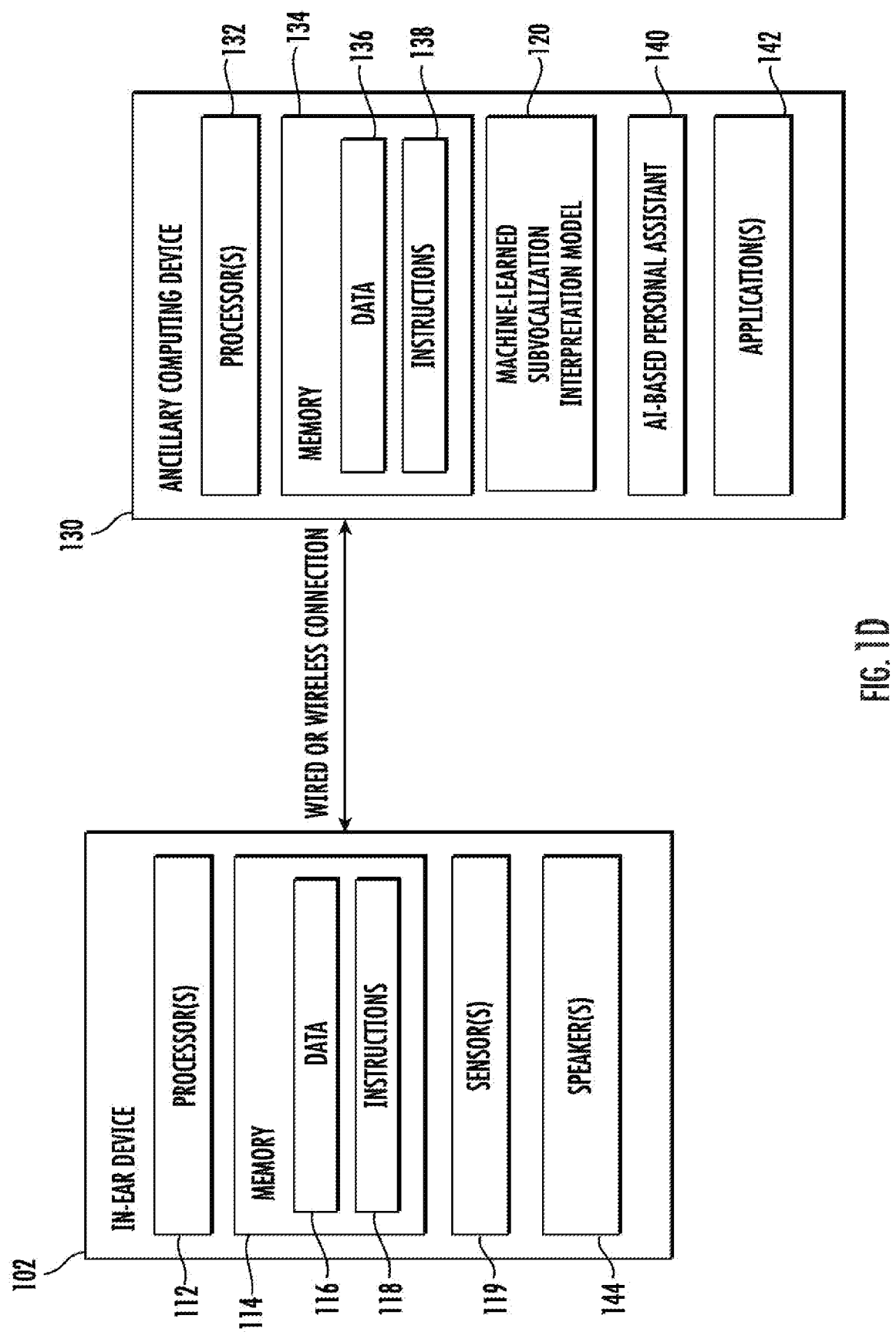

As one specific example, the device 10 can include one or more microphones positioned within the ear 20, for example at least partially within the ear canal 24, and directed toward the ear canal 24, for example directed toward an eardrum 26 within the ear canal. The microphone(s) of the device 10 can record audio signals occurring within the ear canal that are caused by the user performing subvocalization. For example, the audio signals can be at least in part generated by vibration of the eardrum 26, bone conductions, and/or other vibrating structures/tissues FIGS. 1B-D depict block diagrams of example computing systems that include an in-ear device according to example implementations of the present disclosure. Referring specifically to FIG. 1B, an example in-ear device 102 can include one or more processors 112 and a memory 114. The one or more processors 112 can be any suitable processing device, such as a processor core, a microprocessor, an ASIC, a FPGA, a controller, or a microcontroller, and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

The in-ear device 102 can include one or more sensors 119. At least some of the sensors 119 can generate sensor data that describes phenomena occurring in the ear of the user.

As one example, the sensors can 119 can include one or more microphones that convert a sound wave located within an ear canal of the ear of the user to the sensor data. For example, when the in-ear device 102 is placed within the ear of the user, the one or more microphones can be directed toward the eardrum of the user. In some implementations, the in-ear device 102 can include one or more additional microphones that are not located within the ear canal. For example, the additional microphone(s) can collect audio signals that are external to the user's ear, including speech of the user from the user's mouth.

In some implementations, the additional microphone(s) can be used to filter out audio signals from a source external to the user from the audio signals recorded by the one or more microphones directed toward the user. Depending on the volume and frequency of signals from sources external to the user, these signals may leak into the signals recorded by the one or more microphones directed to the user. To compensate for these additional signals, the additional microphone(s) can record external audio that can be later identified and removed from the signals recorded by the one or more microphones directed toward the user.

The accuracy of the one or more microphones in converting a sound wave can be improved in some cases by the shape, size, or intended position of the in-ear device 102 when worn by the user. In some implementations, the in-ear device 102 is shaped so that when worn as intended, the in-ear device 102 sits flush in the ear canal of the user. In these implementations, the shape of the in-ear device 102 can help to focus the microphone(s) in picking up sound waves within the ear canal of the user instead of sound waves from sources external to the user.

As further examples, in addition or alternatively to the microphone(s), the sensors 119 can include some or all of the following: an accelerometer; a gyroscope; a RADAR device; a SONAR device; a LASER microphone; an infrared sensor; and/or a barometer. For example, these sensors can detect and record motion/acceleration, such as by an accelerometer; a gyroscope; physical deformations in the ear such as deformations/vibrations of the eardrum, such as by a RADAR device, a SONAR device, a LASER microphone, or an infrared sensor; and/or pressure changes in the ear, such as by a barometer. The sensor data collected by any or all of these sensors 119 can be used in addition or alternatively to the use of audio data captured by one or more microphones as described herein.

As yet further examples, the one or more sensors 119 can include a thermometer and/or a proximity sensor, such as a sensor that features a conductive coating. The in-ear device 102 can analyze the data generated by these sensors to determine whether or not the in-ear device 102 is currently placed within the user's ear. If the device is not within the user's ear, certain features such as collection of sensor data can be paused until such time as the in-ear device 102 is placed into the ear.

In some implementations, the in-ear device 102 can store and implement one or more machine-learned models 120. For example, the machine-learned models 120 can be or can otherwise include various machine-learned models such as neural networks or other types of machine-learned models, including non-linear models and/or linear models. Neural networks can include feed-forward neural networks, recurrent neural networks such as long short-term memory recurrent neural networks, convolutional neural networks or other forms of neural networks. Example machine-learned models 120 are discussed with reference to FIGS. 2-3.

In some implementations, the in-ear device 102 can store and implement an AI-based personal assistant 140. The AI-based personal assistant 140 can perform certain operations or take certain actions on behalf of the user, for example, based on input received from the user. One example AI-based personal assistant 140 is the Google Assistant.

In some implementations, the in-ear device 102 can store and implement one or more applications 142. The applications 142 can be any applications including, as examples, a text messaging application, a phone call application, an email application, a music application, a web search application, a web browsing application, a mapping application, a calendar application, etc. In some implementations, the AI-based personal assistant 140 can cause the applications 142 to perform various operations, for example through one or more application programming interfaces.

In some implementations, the in-ear device 102 can include one or more speakers 144. For example, the speaker 144 can also be directed toward the eardrum of the user when the device 102 is in the user's ear. The speaker 144 can be used to play music, provide phone call audio to the user, return dialogue from the AI-based personal assistant 140, etc.

Referring now to FIGS. 1C and 1D, in some implementations, some or all of the components described with reference to FIG. 1B can be located in an ancillary computing device 130 rather than the in-ear device 102. For example, this can be done to make the in-ear device 102 lighter, cheaper, smaller, etc.

As one example, with reference to FIG. 1C, the model 120 remains stored at and implemented by the in-ear device 102 but the AI-based personal assistant device 140 and the applications 142 are stored at and implemented by the ancillary computing device 130. In this scenario, the in-ear device 102 can transmit the interpretation provided by the model 120 of the audio signals received by the in-ear device 102, to the ancillary computing device 130.

As another example, with reference to FIG. 1D, all of the model 120, AI-based personal assistant device 140, and the applications 142 are stored at and implemented by the ancillary computing device 130. In this scenario, the in-ear device 102 can transmit the sensor data generated by the sensor(s) 119 to the ancillary computing device 130.

Although shown as part of the in-ear device 102, the model 120 can be implemented off the in-ear device 102. For example, the model 120 can be implemented on another device, such as a server or the ancillary computing device 130. If the model 120 is not implemented directly on the in-ear device 102, then the in-ear device 102 can be configured to transmit and receive data corresponding to the input and output of the model 120, as described in more detail below. The input sent to the model 120 on a device remote to the in-ear device 102 can be raw input received by the sensor(s) 119, or at least partially processed data from the raw input received by the sensor(s) 119.

The ancillary computing device 130 can be any different type of computing device including smartphone, tablet, laptop, server computing device, computing device that can be worn, embedded computing device, vehicle computing device, navigational computing device, gaming console, etc.

In some implementations, the in-ear device 102 and/or ancillary computing device 130 can include network interface(s) to connect to a local- or wide-area network, or the larger Internet as a whole, such as through a data and/or Wi-Fi connection.

Example Model Arrangements

FIG. 2 depicts a block diagram of an example inference scheme for a machine-learned subvocalization interpretation model 202 according to example implementations of the present disclosure. The machine-learned subvocalization interpretation model 202 can receive and process sensor data 204 that were collected from within a user's ear by an in-ear device and while the user subvocalized an utterance. The machine-learned subvocalization interpretation model 202 can process the sensor data 204 to generate an interpretation 206 of a subvocalized utterance.

In some cases, the sensor data 204 can provide for input that can be processed in a more nuanced way by the model 202 for generating an interpretation 206, as compared with a model trained to process audible or non-subvocalized, utterances. This is at least because the sensor data 204 can be more sensitive to different physical actions performed by the user that do not involve speech, e.g., sneezing, chewing, or drinking. The sensor data 204 can represent these actions through utterances that have different physical properties, e.g., pitch, frequency, or tone, relative to subvocalized utterances that correspond to commands or words silently spoken by the user.

For example, sensor data 204 collected by microphones directed towards the ear drum of the user can have markedly different features when the user is eating versus when the user is subvocalizing a command. The model 202 can be trained to interpret these different features to distinguish between subvocalized utterances by the user and noise caused by chewing or drinking.

The differences in the sensor data 204 can correspond to physiological changes in the body of the user in response to normal functions like silently speaking or drinking. For example, recorded utterances picked up by the microphones can be warped, magnified, or muted as vibrations caused by the utterances pass through the body undergoing different bodily functions related to speaking, sneezing, or drinking. As another example, the Eustachian tube or other part of the ear can change shape depending on if the user is sick with a cold, the flu, or allergies. For example, these or other illnesses can cause part of the ear to become inflamed or build up liquid, which can cause the sensor data 204 to vary relative to sensor data recorded while the user is not sick. The variation can occur, for example, because of acoustic differences in the ear of the user when the user is sick/not sick. Therefore, the model 202 can be trained to learn these differences, which may not be as pronounced when only audible speech is detected.

The model 202 can be trained to process incoming sensor data 204 and generate one or more features from the sensor data 204. A feature refers to a quantifiable or categorical characteristic of the data. As an example, the pitch, frequency, and volume of the incoming sensor data 204 can be features used by the model 202 for generating interpretation 206. The model 202 can generate some features as functions of other features, such as a feature measured over time. As an example, one such feature can be the volume of the incoming sensor data 204 over a period of time. The model 202 can generate a feature representing an average volume of the sensor data 204 over the period of time, or the model 202 can identify patterns of changes in volume over time. For example, the latter can be indicative of repetitive action by the user, such as chewing and then pausing between chews. As part of training and described herein, the model 202 can be trained to identify different features and/or identify which features are more relevant towards generating the interpretation 206 than others.

As part of generating features, the model 202 can convert the incoming sensor data 204 into different formats. For example, the model 202 can receive subvocalized utterances and convert the utterances into spectrograms. A spectrogram is a visual representation of an audio signal over some domain. For example, the spectrogram can represent changes in frequency of the audio signal visually over a period of time. The model 202 can process the spectrogram to generate additional features from the incoming sensor data 204. For example, the model 202 can generate features from spectrograms representing changes in amplitudes caused by variations in frequency in the incoming sensor data 204 as indicated in the spectrograms.

One reason for converting sensor data 204 into different formats is to be able to leverage feature extraction techniques particular to a given format. For example, by converting incoming sensor data 204 to spectrograms, the model 202 can leverage any of a variety of different machine learning feature generation techniques for image data, which may not have been applicable to the incoming sensor data 204 as subvocalized utterances.

As examples, the interpretation 206 can include a textual transcript of the subvocalized utterance and/or classification of the subvocalized utterance into a plurality of predefined classes, which may correspond to a plurality of predefined commands or actions such as "Play my favorite album".

Thus, in some implementations, the machine-learned subvocalization interpretation model 202 can translate the sensor data 204 into a representation which can be translated, such as by the same model 202 or another model into (a) special commands, such as "what's the time?", "when is my next meeting?", "play music"; (b) text, such as "send email to my partner that I bought ingredients and will cook dinner tonight"; and/or (c) speech, such as "make a call to the dentist", or "Hello, I'd like to book an appointment next week". The interpretation 206 of the subvocalized utterance can be used, for example by an artificial intelligence (AI)-based personal assistant, to cause one or more operations, for example entering or responding to the textual transcript or performing the requested action such as playing a certain musical album, or booking an appointment. Thus, the machine-learned model 202 can be configured to decode the sensor data 204 into an actionable and/or understandable interpretation 206 such as a textual transcription of the subvocalized utterance.

In addition, because the interpretation 206 can include a textual transcript, received subvocalized utterances can be processed end-to-end with the machine-learned subvocalization interpretation model 202 and another model configured to receive textual transcript as input. The second model can be an (AI)-based assistant, or another model configured to receive, as input, the textual transcript, and cause one or more of the in-ear device 102, the ancillary computing device 130, or another device to perform an action in response to the textual transcript.

For example, the model configured to receive the textual transcript of the interpretation 206 can be trained to read the transcript, identify one or more special commands or text, and cause the devices 102, 130 to perform an action in response to the identified commands or text. The model configured to receive the textual transcript can be configured according to any of a variety of different techniques for processing text using machine learning. Therefore, the model 202 can generate the interpretation 206 which can be used flexibly by any model configured to receive textual transcripts as input. In some implementations, the model 202 is trained to cause the devices 120, 130 to perform an action in response to commands or text represented in the interpretation 206, without the use of an additional model.

The in-ear device 102 can be configured to continuously process the transcript or process incoming signals to search for the presence of special commands, consistent with techniques for "hotword detection." In other words, the in-ear device 102 can be configured to begin subsequent processing of the incoming data only upon detection or one or more special commands or hotwords.

The interpretation 206 can also include an output audible audio signal, such as audio that is not a subvocalization, which in some implementations the subvocalization interpretation model 202 is configured to generate from the sensor data 204. The output audible audio signal can correspond to commands or words spoken in a recorded subvocalized utterance. The output audio signal can be processed by another model configured to receive and process the audio signal to identify special commands or speech. This additional model can be the (AI)-based assistant, or another model. This additional model can be further configured to pass data representing the identified special commands or speech from the audio signal, to another model configured to cause the devices 102, 130 to perform an action in response to the identified commands or text. In some implementations the model 202 is trained to cause the devices 120, 130 to perform an action in response to commands or speech represented in the interpretation 206, without the use of an additional model.

Referring now to FIG. 3, in some implementations, the machine-learned subvocalization model 202 can be trained in a supervised learning approach. A training dataset 302 can include sets of training sensor data 304, such as audio signals captured by microphones, that was collected while a person was subvocalizing a known string with a ground truth interpretation. Therefore, the interpretation 306 provided by the model 202 on each set of training sensor data 304 can be compared to the ground truth interpretation 354 using a loss function 356. The model 202 can be trained using the loss function 356 to compute a gradient of the loss function 356 with respect to model parameter values, such as weights of a neural network. For example, the values of the parameters of the model 202 can be updated as the loss function 356 is backpropagated through the model 202.

In some implementations, the training dataset 302 can include data collected as part of a user training/on-boarding procedure in which a new user is asked to perform subvocalizations of known content, such as by reading certain text without pushing air through the user's vocal cords. The model 202 can be trained, re-trained, refined, or personalized based on the calibration data, such as by using the supervised scheme described herein with reference to FIG. 3. This can enable the subvocalization interpretation model 202 to have improved accuracy for a specific user. The model 202 can perform this training procedure once, for example when the user operates the in-ear device 102 for the first time, or multiple times, for example periodically or in response to a user request.

Additionally or alternatively, in some implementations, the subvocalization model can first be trained on generic audible speech examples. The model trained on normal audio can then be refined via transfer learning to train on the subvocalization data. In some implementations, instead of modifying lower layers, higher layers can simply be added to the top of the transferred model. The model can process input from the bottom-up, beginning with the input subvocalization processed through the lower layers trained on normal audio and then through the added higher layers. These added higher layers can be trained on the smaller dataset collected via the in-ear microphone array from a variety of users.

The added higher layers can be trained to learn which feature or features processed by the lower layers are relevant for generating the interpretation 206. For example, the lower layers of the model can be trained on generic audible speech examples, and can be configured to generate, as intermediate output, processed data representing features of the input subvocalization. The higher layers of the model, trained on a dataset of subvocalized utterances from a variety of users, can receive the intermediate output, as input. The higher layers of the model can be trained to learn weights for processing some or all of the features of the input subvocalization, for example using any of a variety of learning techniques described herein with reference to FIG. 4. During processing, the higher layers may generate one or more additional features from the features represented in the intermediate output.

By beginning with a model at least partially trained on audible speech examples, a model can be more quickly trained to generate interpretations of subvocalized utterances, in accordance with aspects of this disclosure. Training a model as described herein can be advantageous, at least because labeled speech examples audible speech may be easier to obtain in large amounts versus labeled speech examples of subvocalized speech. Even if both forms of speech examples are readily available, in some implementations the model can be trained as described herein to more accurately generate interpretations of subvocalized utterances, at least because the model can be trained from a larger combination of training by both types of examples, versus training on a smaller set of subvocalized utterances alone.

Example Training Environment

Figure 4:
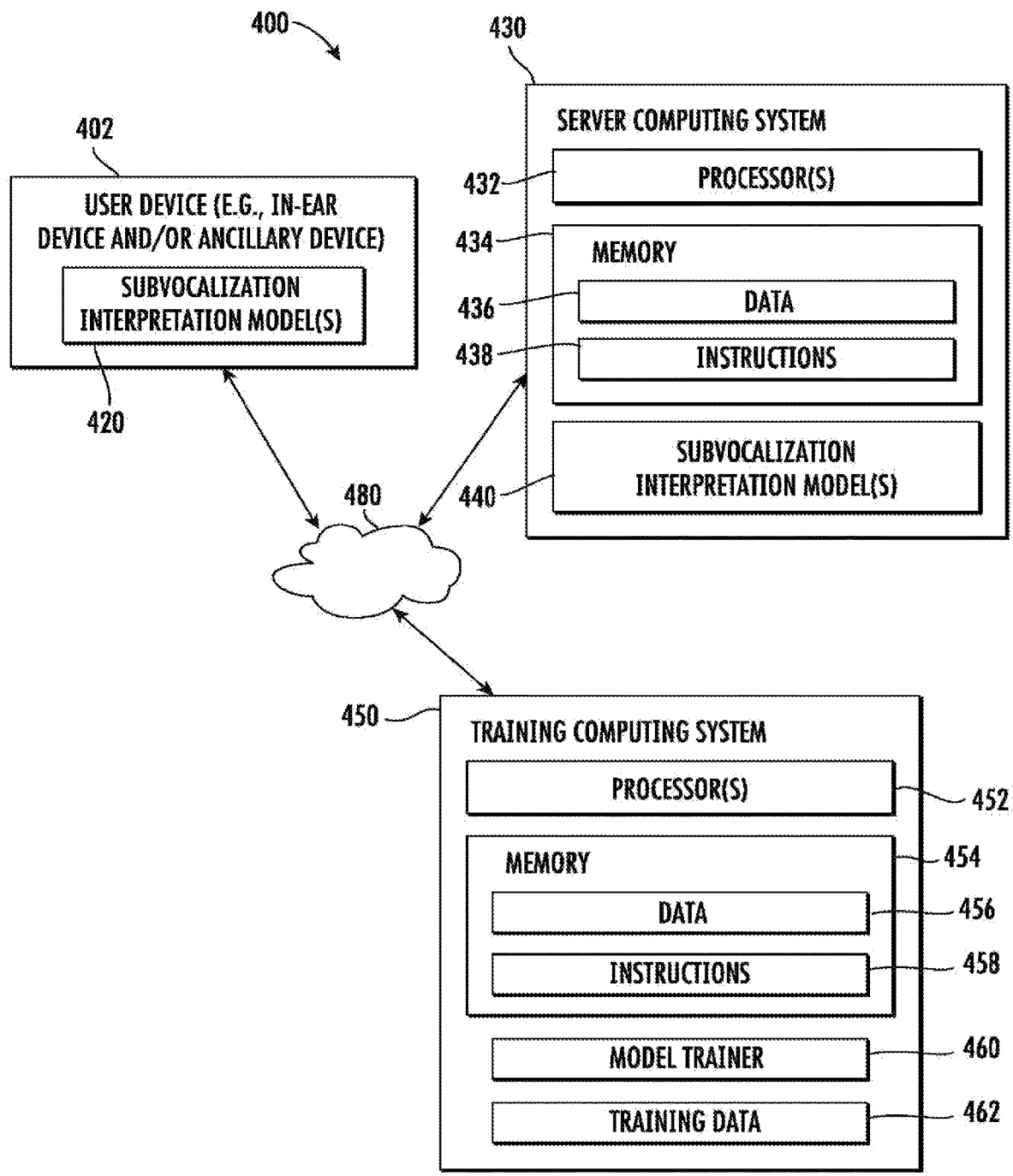
FIG. 4 depicts a block diagram of an example computing system for training machine learned models according to example implementations of the present disclosure.

FIG. 4 depicts a block diagram of an example computing system 400 for training machine-learned models according to example implementations of the present disclosure. The system 400 includes a user computing device 402, a server computing system 430, and a training computing system 450 that are communicatively coupled over a network 480.

The user computing device 402 can be any type of computing device, such as, for example, a personal computing device, such as a laptop or desktop computer, a mobile computing device, such as a smartphone or tablet, a gaming console or controller, a wearable computing device, an embedded computing device, or any other type of computing device.

In some implementations, the user computing device 402 can store or include one or more machine-learned models 420. For example, the machine-learned models 420 can be or can otherwise include various machine-learned models such as neural networks, such as deep neural networks, or other types of machine-learned models, including non-linear models and/or linear models. Neural networks can include feed-forward neural networks, recurrent neural networks, such as long short-term memory recurrent neural networks, convolutional neural networks or other forms of neural networks.

In some implementations, the one or more machine-learned models 420 can be received from the server computing system 430 over network 480 and then stored and implemented at the user computing device 402. In some implementations, the user computing device 402 can implement multiple parallel instances of a single machine-learned model 420, such as to perform parallel subvocalization interpretation across multiple instances of sensor data.

Additionally or alternatively, one or more machine-learned models 440 can be included in or otherwise stored and implemented by the server computing system 430 that communicates with the user computing device 402 according to a client-server relationship. For example, the machine-learned models 440 can be implemented by the server computing system 440 as a portion of a web service, such as a subvocalization interpretation service. Thus, one or more models 420 can be stored and implemented at the user computing device 402 and/or one or more models 440 can be stored and implemented at the server computing system 430.

The user computing device 402 can also include one or more user input component 422 that receives user input. For example, the user input component 422 can be a touch-sensitive component, such as a touch-sensitive display screen or a touch pad that is sensitive to the touch of a user input object, such as a finger or a stylus. The touch-sensitive component can serve to implement a virtual keyboard. Other example user input components include a microphone, a traditional keyboard, or other means by which a user can provide user input.

The server computing system 430 includes one or more processors 432 and a memory 434. The one or more processors 432 can be any suitable processing device, such as a processor core, a microprocessor, an ASIC, a FPGA, a controller, or a microcontroller, can be one processor or a plurality of processors that are operatively connected. The memory 434 can include one or more non-transitory computer-readable storage mediums, such as RAM, ROM, EEPROM, EPROM, flash memory devices, or magnetic disks, and combinations thereof. The memory 434 can store data 436 and instructions 438 which are executed by the processor 432 to cause the server computing system 430 to perform operations.

In some implementations, the server computing system 430 includes or is otherwise implemented by one or more server computing devices. In instances in which the server computing system 430 includes plural server computing devices, such server computing devices can operate according to sequential computing architectures, parallel computing architectures, or some combination thereof.

As described above, the server computing system 430 can store or otherwise include one or more machine-learned models 440. For example, the models 440 can be or can otherwise include various machine-learned models. Example machine-learned models include neural networks or other multi-layer non-linear models. Example neural networks include feed forward neural networks, deep neural networks, recurrent neural networks, and convolutional neural networks.

The user computing device 402 and/or the server computing system 430 can train the models 420 and/or 440 via interaction with the training computing system 450 that is communicatively coupled over the network 480. The training computing system 450 can be separate from the server computing system 430 or can be a portion of the server computing system 430.

The training computing system 450 includes one or more processors 452 and a memory 454. The one or more processors 452 can be any suitable processing device, such as a processor core, a microprocessor, an ASIC, a FPGA, a controller, or a microcontroller and can be one processor or a plurality of processors that are operatively connected. The memory 454 can include one or more non-transitory computer-readable storage mediums, such as RAM, ROM, EEPROM, EPROM, flash memory devices, or magnetic disks, and combinations thereof. The memory 454 can store data 456 and instructions 458 which are executed by the processor 452 to cause the training computing system 450 to perform operations. In some implementations, the training computing system 450 includes or is otherwise implemented by one or more server computing devices.

The training computing system 450 can include a model trainer 460 that trains the machine-learned models 420 and/or 440 stored at the user computing device 402 and/or the server computing system 430 using various training or learning techniques, such as, for example, backwards propagation of errors. For example, a loss function can be backpropagated through the model(s) to update one or more parameters of the model(s), for example based on a gradient of the loss function. Various loss functions can be used such as mean squared error, likelihood loss, cross entropy loss, hinge loss, and/or various other loss functions. Gradient descent techniques can be used to iteratively update the parameters over a number of training iterations.

In some implementations, performing backpropagation can include performing truncated backpropagation through time. The model trainer 460 can perform a number of generalization techniques, such as decaying weights, or performing dropout, to improve the generalization capability of the models being trained.

In particular, the model trainer 460 can train the machine-learned models 420 and/or 440 based on a set of training data 462. The training data 462 can include, for example, supervised training data, including user-specific supervised training data generated, for example, during a calibration routine.

Thus, in some implementations, if the user has provided consent, the training examples can be provided by the user computing device 402. Thus, in such implementations, the model 420 provided to the user computing device 402 can be trained by the training computing system 450 on user-specific data received from the user computing device 402. In some instances, this process can be referred to as personalizing the model.

The model trainer 460 includes computer logic utilized to provide desired functionality. The model trainer 460 can be implemented in hardware, firmware, and/or software controlling a general purpose processor. For example, in some implementations, the model trainer 460 includes program files stored on a storage device, loaded into a memory and executed by one or more processors. In other implementations, the model trainer 460 includes one or more sets of computer-executable instructions that are stored in a tangible computer-readable storage medium such as RAM hard disk or optical or magnetic media.

The model trainer 460 can train the subvocalization interpretation models 420 according to different hyperparameters associated with model training, such as different learning rates, batch sizes, and other hyperparameters associated with the particular type of model implemented, or the particular technique used to train the models 420. The model trainer 460 can also implement any variety of techniques for hyperparameter search or optimization, for example random search, or population- or evolutionary-based techniques on an ensemble of models.

The network 480 can be any type of communications network, such as a local area network, such as intranet, wide area network, such as the Internet, or some combination thereof and can include any number of wired or wireless links. In general, communication over the network 480 can be carried via any type of wired and/or wireless connection, using a wide variety of communication protocols, such as TCP/IP, HTTP, SMTP, FTP, encodings or formats, such as HTML, XML, and/or protection schemes, such as VPN, secure HTTP, or SSL.

FIG. 4 illustrates one example computing system that can be used to implement the present disclosure. Other computing systems can be used as well. For example, in some implementations, the user computing device 402 can include the model trainer 460 and the training dataset 462. In such implementations, the models 420 can be both trained and used locally at the user computing device 402. In some of such implementations, the user computing device 402 can implement the model trainer 460 to personalize the models 420 based on user-specific data. In other words, the model trainer 460 can train the models 420 offline, online, or according to a hybrid approach.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example implementations thereof, each example is provided by way of explanation, not limitation of the disclosure. Those skilled in the art, upon attaining an understanding of the foregoing, can readily produce alterations to, variations of, and equivalents to such implementations. Accordingly, the subject disclosure does not preclude inclusion of such modifications, variations and/or additions to the present subject matter as would be readily apparent to one of ordinary skill in the art. For instance, features illustrated or described as part of one implementation can be used with another implementation to yield a still further implementation. Thus, it is intended that the present disclosure cover such alterations, variations, and equivalents.

Although aspects of the present disclosure focus on an in-ear device configured to be positioned within an ear of a user, the principles described herein can also be adapted to interpretation of sensor data collected from sensors positioned on other locations relative to the user's body. For example, data collected by a sensor in a pair of eyeglasses, such as by a sensor positioned on the bridge of the eyeglasses so as to contact a bridge of the user's node, during subvocalization by the user can be analyzed using machine learning to generate an interpretation of the subvocalization. As another example, data collected by a sensor in a necktie, such as by a sensor positioned on the necktie so as to contact the user's neck such as the user's epiglottis, during subvocalization by the user can be analyzed using machine learning to generate an interpretation of the subvocalization.

The invention claimed is:

1. An electronic device, comprising:
   one or more processors; and
   one or more non-transitory computer-readable media that store instructions that when executed by the one or more processors cause the electronic device to perform operations, the operations comprising:
   receiving sensor data generated by at least one sensor at least partially positioned within an ear of a user, the sensor data generated by the at least one sensor concurrently with the user subvocalizing a subvocalized utterance, the subvocalized utterance being pronounced but inaudible speech caused by passing little to no air through a varying formation of a mouth of the user without excitation of vocal cords of the user; and
   processing the sensor data with a machine-learned subvocalization interpretation model to generate an interpretation of the subvocalized utterance as an output of the machine-learned subvocalization interpretation model.

2. The electronic device of claim 1, wherein the at least one sensor comprises one or more microphones that convert a sound wave located within an ear canal of the ear of the user to the sensor data.

3. The electronic device of claim 2, wherein the sound wave located within the ear canal of the ear of the user is generated by an eardrum of the user.

4. The electronic device of claim 2 wherein, when the one or more microphones are placed within the ear of the user, the one or more microphones are directed toward the eardrum of the user.

5. The electronic device of claim 1, wherein the at least one sensor comprises one or more of:
   an accelerometer;
   a gyroscope;
   a RADAR device;
   a SONAR device;
   a LASER microphone;
   an infrared sensor; or
   a barometer.

6. The electronic device of claim 1, wherein the electronic device is sized and shaped to be at least partially positioned within the ear of the user.

7. The electronic device of claim 1, wherein the electronic device is coupled to an ancillary support device that is physically separate from the at least one sensor.

8. The electronic device of any of claim 1, wherein the interpretation of the subvocalized utterance output by the machine-learned subvocalization interpretation model comprises a transcript of the subvocalized utterance in textual form.

9. The electronic device of claim 1, wherein the interpretation of the subvocalized utterance output by the machine-learned subvocalization interpretation model comprises a classification of the subvocalized utterance into one or more of a plurality of categories.

10. The electronic device of claim 9, wherein the plurality of categories compose a plurality of defined commands.

11. The electronic device of claim 1, wherein the operations further comprise:
    determining, by an artificial intelligence-based personal assistant system, at least one operation to perform based at least in part on the interpretation of the subvocalized utterance output by the machine-learned subvocalization interpretation model.

12. The electronic device of claim 1, wherein the passing little to no air through the varying formation of the mouth of the user results in a nearly-inaudible whisper or "silent speech".

13. The electronic device of claim 1, wherein the passing little to no air through the varying formation of the mouth of the user passes no air.

14. An ear bud, comprising:
    at least one sensor;
    one or more processors; and
    one or more non-transitory computer-readable media that store instructions that when executed by the one or more processors cause the ear bud to perform operations, the operations composing:
    receiving sensor data generated by the at least one sensor, the sensor data generated by the at least one sensor concurrently with the user subvocalizing a subvocalized utterance and with the at least one sensor at least partially positioned within an ear of a user, the subvocalized utterance being pronounced but inaudible speech caused by passing little to no air through a varying formation of a mouth of the user without excitation of vocal cords of the user; and
    processing the sensor data with a machine-learned subvocalization interpretation model to generate an interpretation of the subvocalized utterance as an output of the machine-learned subvocalization interpretation model.

15. The ear bud of claim 14, wherein the at least one sensor comprises a microphone that converts a sound wave located within an ear canal of the ear of the user to the sensor data.

16. The ear bud of claim 15, wherein the sound wave located within the ear canal of the ear of the user is generated by an eardrum of the user.

17. The ear bud of claim 15, wherein, when the microphone is placed within the ear of the user, the microphone is directed to the eardrum of the user.

18. The ear bud of claim 14, wherein the interpretation of the subvocalized utterance output by the machine-learned subvocalization interpretation model comprises a transcript of the subvocalized utterance in textual form.

19. The ear bud of claim 14, wherein the interpretation of the subvocalized utterance output by the machine-learned subvocalization interpretation model comprises a classification of the subvocalized utterance into one or more of a plurality of categories.

20. The ear bud of claim 19, wherein the plurality of categories comprise a plurality of defined commands.

21. The ear bud of claim 14, wherein the operations further comprise:
determining, by an artificial intelligence-based personal assistant system, at least one operation to perform based at least in part on the interpretation of the subvocalized utterance output by the machine-learned subvocalization interpretation model.

22. A method, comprising:
generating, by at least one sensor at least partially positioned within an ear of a user, sensor data representative of a subvocalized utterance made by the user, the subvocalized utterance being pronounced but inaudible speech caused by passing little to no air through a varying formation of a mouth of the user without excitation of vocal cords of the user; and
processing the sensor data with a machine-learned subvocalization interpretation model to generate an interpretation of the subvocalized utterance as an output of the machine-learned subvocalization interpretation model.

* * * * *